（12）United States Patent
Kyung et al.

(10) Patent No.: US 7,839,812 B2
(45) Date of Patent: Nov. 23, 2010

(54) METHOD FOR TRANSMITTING AND RECEIVING PACKET IN MOBILE COMMUNICATION SYSTEM

(75) Inventors: Chan Ho Kyung, Gyeonggi-do (KR); Ki Jun Kim, Gyeonggi-do (KR); Jong Hoe An, Gyeonggi-do (KR); Young Jun Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 437 days.

(21) Appl. No.: 11/815,204

(22) PCT Filed: Feb. 3, 2006

(86) PCT No.: PCT/KR2006/000402

§ 371 (c)(1),
(2), (4) Date: May 22, 2008

(87) PCT Pub. No.: WO2006/098550

PCT Pub. Date: Sep. 21, 2006

(65) Prior Publication Data

US 2009/0046612 A1    Feb. 19, 2009

(30) Foreign Application Priority Data

Feb. 4, 2005    (KR) .................... 10-2005-0010680
Feb. 11, 2005   (KR) .................... 10-2005-0011663

(51) Int. Cl.
*H04J 3/24* (2006.01)

(52) U.S. Cl. ..................................... 370/312; 370/349

(58) Field of Classification Search ................. 370/252, 370/312, 349, 314, 321, 347
See application file for complete search history.

(56) References Cited

U.S. PATENT DOCUMENTS

| 7,643,461 | B2 * | 1/2010 | Choi et al. .................. 370/341 |
| 2005/0157669 | A1 * | 7/2005 | Zhu et al. .................... 370/312 |
| 2005/0271027 | A1 * | 12/2005 | Kim et al. .................... 370/343 |

FOREIGN PATENT DOCUMENTS

| EP | 1496638 A2 | 1/2005 |
| KR | 10-2002-0082063 A | 10/2002 |
| KR | 10-2003-0033158 A | 5/2003 |

* cited by examiner

*Primary Examiner*—Brenda Pham
(74) *Attorney, Agent, or Firm*—Lee, Hong, Degerman, Kang & Waimey

(57) ABSTRACT

The present invention relates to a packet reception method. In a packet reception method applied to a mobile communication system, in which data transmission is performed by repeating at least two interlaces by a predetermined cycle, the present invention includes the steps of receiving a broadcast/multicast packet from a base station, receiving a broadcast overhead message including information of a reference multiplex burst length and information about multiplexes, each having a burst length different from the reference multiplex burst length, and decoding the received broadcast/multicast packet using the information included in the broadcast overhead message. Accordingly, the present invention can efficiently transmit the broadcast overhead message required for the packet data decoding.

7 Claims, 1 Drawing Sheet

METHOD FOR TRANSMITTING AND RECEIVING PACKET IN MOBILE COMMUNICATION SYSTEM

TECHNICAL FIELD

The present invention relates to a packet transmitting/receiving method applied to mobile communications, and more particularly, to a method of transmitting/receiving a packet to perform packet transmission more efficiently by transmitting a broadcast overhead message necessary for packet decoding more efficiently.

BACKGROUND ART

Generally, in a mobile communication system, a broadcast overhead message includes information enabling a mobile station to stably receive and decode packet data channel or broadcast channel transmitted from a base station in case of performing a broadcast/multicast (hereinafter abbreviated 'BCMC') service in the mobile communication system.

In a mobile communication system supporting BCMC, a high data rate is required since multimedia data including audio and video needs to be transmitted. To perform the broadcast/multicast service, a packet data channel of a physical layer needs to support a high data rate.

To stably transmit multimedia data via the packet data channel in a radio environment having fading, Hybrid Automatic Repeat Request (hereinafter 'HARQ') system is applied. In HARQ, technical features of Forward Error Correction (hereinafter abbreviated 'FEC') function and Automatic Repeat Request (hereinafter abbreviated 'ARQ') are combined together.

The HARQ system is explained in detail as follows. First of all, encoding is carried out on data to be transmitted using a channel coder having an error correction function, e.g., turbo encoder, and at least one sub-packet corresponding to one encoded packet is transmitted.

Once a transmitting side transmits a first sub-packet, a receiving side decodes the received first sub-packet. If the decoding is successfully completed, signal notifying a successful reception (acknowledgement; hereinafter abbreviated 'ACK') is transmitted to the transmitting side. Meanwhile, if the decoding of the received first sub-packet fails, signal notifying failure of reception (negative acknowledgement; hereinafter abbreviated 'NACK') is fed back to the transmitting side.

In case of receiving the ACK signal, the transmitting side transmits a first sub-packet corresponding to a next packet. Meanwhile, in case of receiving the NACK signal, the transmitting side transmits a second sub-packet corresponding to the previously transmitted packet. In this case, the receiving side stores the first sub-packet in a buffer to raise a decoding success rate in a manner of performing decoding by combining the first and second sub-packets together.

FIG. 1 is an exemplary diagram for a HARQ implementing method on interlace structure. Referring to FIG. 1, a channel for packet data transmission can be implemented with a structure that each interlace is regularly repeated with each fixed time interval. In an example shown in FIG. 1, since a packet data channel includes four interlaces, one packet is transmitted using one of the four interlaces. Once an interlace to be transmitted is determined, a corresponding packet is transmitted via the determined interlace. This is explained in detail as follows.

Referring to FIG. 1, it is assumed that packet #0 is transmitted using interlace #0. A transmitting side transmits a first sub-packet corresponding to packet #0 to a receiving side via interlace #0. The receiving side receives the first sub-packet and then performs decoding on the received first sub-packet. As a result of decoding the received first packet, if the decoding fails, the receiving side feeds back a NACK signal to the transmitting side. The transmitting side having received the NACK signal transmits a second sub-packet corresponding to the packet #0 to the receiving side using the interlace #0. Having received the second sub-packet, the receiving side performs decoding by combining the second sub-packet and the first sub-packet stored in a buffer together. If the decoding fails again, the receiving side feeds back a NACK signal to the transmitting side.

Having received the NACK signal, the transmitting side transmits a third sub-packet corresponding to the packet #0 to the receiving side using the interlace #0 again. Such a process is repeatedly performed until an ACK signal is received or a critical count is reached. Thus, each sub-packet corresponding one packet is transmitted using the same interlace.

Broadcast/multicast data is transmitted via a packet data channel having the above explained interlace structure and one interlace includes at least one or more multiplexes. Preferably, one interlace includes four, eight or sixteen multiplexes. So, an interlace-multiplex pair is used to indicate that a packet is transmitted through which multiplex within which interlace.

For each interlace-multiplex pair, a burst length is determined. The burst length is determined by multiplying a number of sub-packets per packet, which is determined by a data rate, by a number of packets per buts to be transmitted. The interlace-multiplex pair consecutively occupies a specific interval of the same interlace as the burst length.

So, a packet data channel carrying broadcast/multicast data includes sub-channels defined by interlace-multiplex pair. In a base station, one logical channel including at least one broadcast/multicast service (hereinafter abbreviated 'BCMCS') flow is mapped to at least one interlace-multiplex pair.

To transmit information associated with interlace-multiplex pair to a mobile subscriber station, an overhead message is transmitted from a base station. The overhead message includes information indicating that BCMC service flows are transmitted through which interlace from a specific base station and information about multiplex burst length. In the related art, all information about burst length of each multiplex configuring one interlace is transmitted to increase a size of the overhead message.

DISCLOSURE OF INVENTION

The object of the present invention is to raise packet transmission efficiency in a mobile communication system by transmitting a broadcast overhead message for packet transmission decoding more efficiently.

To achieve these and other advantages and in accordance with the purpose of the present invention, in a packet reception method applied to a mobile communication system, in which data transmission is performed by repeating at least two interlaces by a predetermined cycle, the packet reception method according to the present invention includes the steps of receiving a broadcast/multicast packet from a base station, receiving a broadcast overhead message including information of a reference multiplex burst length and information about multiplexes, each having a burst length different from the reference multiplex burst length, and decoding the received broadcast/multicast packet using the information included in the broadcast overhead message.

In this case, it is preferable that the reference multiplex burst length corresponds to a burst length of a group having a biggest number of multiplex members in case that the multiplexes are grouped according to burst length equality.

And, it is preferable that the broadcast overhead message further includes information about a value of totaling the burst length of at least one or more multiplexes configuring one interlace.

In another aspect of the present invention, in a packet transmission method applied to a mobile communication system, in which data transmission is performed by repeating at least two interlaces by a predetermined cycle, the packet transmission method includes the steps of determining a specific burst length among burst lengths corresponding to at least one or more multiplexes, respectively as a reference burst length, transmitting burst length information corresponding to each of the multiplexes by omitting the burst length information corresponding to the multiplex having the burst length equal to the reference burst length, and transmitting a packet corresponding to the interlace and multiplex.

In this case, it is preferable that the burst length information is transmitted in a broadcast overhead message format. And, it is preferable that the reference burst length corresponds to a burst length of a group having a biggest number of multiplex members in case that the multiplexes are grouped according to burst length equality.

In case that packet data is transmitted using an interlace-multiplex pair structure, the present invention can transmit the broadcast overhead message necessary for the packet data decoding more efficiently.

BEST MODE FOR CARRYING OUT THE INVENTION

Figure 1:
FIG. 1 is an exemplary diagram for a HARQ implementing method on an interlace structure.

The aforesaid objectives, features and advantages of the invention will be set forth in the description which follows, and in part will be apparent from the description. Reference will now be made in detail to one preferred embodiment of the present invention, examples of which are illustrated in the accompanying drawing.

The present invention is applicable to such a technology as cdma2000 1x EVDO, cdma2000 1x EVDV, GPRS, HSDPA and the like. In the description of the present invention, the cdma2000 1x EVDO system is adopted for example.

BCMC service and interlace structure of the present invention are described in detail in 3GPP2 standard, which can be referred to by the detailed description of the present invention.

Table 1 shows an example of a broadcast overhead message.

TABLE 1

| | |
|---|---|
| Interlace0Included | 1 |
| SameBurstLengths0 | 0 or 1 |
| TotalBurstLength0 | 0 or 10 |
| Zero, one or MultiplexesPerInterlace − 1 occurrence of the following field: | |
| BurstLength0 | 4 |
| Interlace1Included | 1 |
| SameBurstLengths1 | 0 or 1 |
| TotalBurstLength1 | 0 or 10 |

TABLE 1-continued

| | |
|---|---|
| Zero, one or MultiplexesPerInterlace − 1 occurrence of the following field: | |
| BurstLength1 | 4 |
| Interlace2Included | 1 |
| SameBurstLengths2 | 0 or 1 |
| TotalBurstLength2 | 0 or 10 |
| Zero, one or MultiplexesPerInterlace − 1 occurrence of the following field: | |
| BurstLength2 | 4 |
| Interlace3Included | 1 |
| SameBurstLengths3 | 0 or 1 |
| TotalBurstLength3 | 0 or 10 |
| Zero, one or MultiplexesPerInterlace − 1 occurrence of the following field: | |
| BurstLength3 | 4 |

Each field of the broadcast overhead message is explained in detail as follows.

In Table 1, Interlace0Included, Interlace1Included, Interlace2Include and Interlace3Included are fields to indicate what kind of interlace is used in transmitting BCMC service flows from a base station. 1-bit length is allocated to each of the fields. If the field is set to '1', it means that a logical channel is transmitted via a corresponding interlace. If the field is set to '0', it means that a logical channel is not transmitted via a corresponding interlace.

The SameBurstLength0 field is an indicator indicating whether burst lengths of all multiplexes configuring interlace #0 are identical to each other. Namely, if the SameBurstLength0 is '1', it means that burst lengths of all multiplexes are identical. If the SameBurstLength0 is '0', it means that burst lengths of all multiplexes are different from each other.

TotalBurstLength0 is not transmitted if SameBurstLength0 is '1'. Yet, if SameBurstLength0 is '0' since lengths of multiplex bursts are different from each other, TotalBurstLength0 plays a role in indicating a total length of all multiplexes. And. 10 bits are allocated to TotalBurstLength0 field.

In Table 1, the BurstLength0 field is omitted if the Interlace0Included is '0'. Meanwhile, if Interlace0Included is '1' and if SameBurstLength0 is '1', it means that lengths of all multiplex bursts configuring Interlace #0 are equal to each other. So, 4-bits are allocated to BurstLength0 to indicate a length common to all multiplexes.

If a value of SameBurstLength0 is '0', it means that lengths of multiplexes are different from each other. So, BurstLength0 are needed as many as the number of (MultiplexesPerInterlace−1). The MultiplexesPerInterlace is a parameter indicating how many multiplexes configure on interlace. And, the MultiplexesPerInterlace can have a value of 4, 8 or 16. BurstLength0 has a 4-bit length, and a mapping table is needed to designate a multiplex burst length using 4-bit information. Table 2 shows an example of a mapping table.

TABLE 2

| BurstLength Field | Burst Length (slots) |
|---|---|
| '0000' | 1 |
| '0001' | 2 |
| '0010' | 3 |
| '0011' | 4 |
| '0100' | 6 |
| '0101' | 8 |
| '0110' | 9 |

TABLE 2-continued

| BurstLength Field | Burst Length (slots) |
|---|---|
| '0111' | 12 |
| '1000' | 16 |
| '1001' | 20 |
| '1010' | 24 |
| '1011' | 32 |
| '1100' | 36 |
| '1101' | 48 |
| '1110' | 60 |
| '1111' | 64 |

For Interlace #1, Interlace #2 and Interlace #3, fields having the same structure of the above-explained Interlace #0 are configured, respectively.

In transmitting a broadcast overhead message in a manner according to Table 1, there occurs no problem if burst lengths of all multiplexes configuring a specific interlace are equal to each other. Yet, if burst lengths of all multiplexes configuring a specific interlace are different from each other, a broadcast overhead message needs to include a BurstLength value amounting to the number of (MultiplexesPerInterlace−1).

A multiplex burst length from $1^{st}$ multiplex to (MultiplexesPerInterlace−1)$^{th}$ multiplex is determined by a BurstLength0 field value amounting to (MultiplexesPerInterlace−1) and Table 2. Meanwhile, a length of a last ((MultiplexesPerInterlace−1)$^{th}$) multiplex burst is determined by Formula 1. For instance, if MultiplexesPerInterlace is 16, i.e., if one interlace is configured with sixteen multiplexes ($0^{th}$ to $15^{th}$), a length of the $15^{th}$ multiplex burst can be calculated by Formula 1.

$$\text{Burst\_Length}(MultiplexesPerInterlace) = \text{Total\_Burst\_Length} - \sum_{i=1}^{MultiplexesPerInterlace-1} \text{Burst\_Length}(i) \quad [\text{Fomula 1}]$$

In Formula 1, Burst_Length(i) means a multiplex burst length of $i^{th}$ multiplex and Total_Burst_Length means a multiplex burst length of all multiplexes.

Meanwhile, in case that Interlace #0 includes sixteen multiplexes of $0^{th}$ to $15^{th}$ for example, TotalBurstLength0 is not transmitted for $15^{th}$ multiplex burst length information transmission but $15^{th}$ MurstLength0 can be directly transmitted.

Table 3 shows an example of a broadcast overhead message.

TABLE 3

| Interlace0Included | 1 |
|---|---|
| SameBurstLengths0 | 0 or 1 |
| Zero, one or MultiplexesPerInterlace − 1 occurrence of the following field: | |
| BurstLength0 | 4 |
| Interlace1Included | 1 |
| SameBurstLengths1 | 0 or 1 |
| Zero, one or MultiplexesPerInterlace − 1 occurrence of the following field: | |
| BurstLength1 | 4 |
| Interlace2Included | 1 |
| SameBurstLengths2 | 0 or 1 |
| Zero, one or MultiplexesPerInterlace − 1 occurrence of the following field: | |
| BurstLength2 | 4 |
| Interlace3Included | 1 |
| SameBurstLengths3 | 0 or 1 |

TABLE 3-continued

| Zero, one or MultiplexesPerInterlace − 1 occurrence of the following field: | |
|---|---|
| BurstLength3 | 4 |

Referring to Table 3, an overhead message without TotalBurstLength field indicating a total burst length can be transmitted. In this case, a field indicating a last burst length is appended to transmit multiplex length information.

For instance, in case that Interlace #0 is configured with sixteen multiplexes ($0^{th}$ to $15^{th}$), a case that $15^{th}$ BurstLength0 field is directly configured is compared to a case that BurstLength0 field for burst length information transmission of $15^{th}$ multiplex is not separately configured in message length as follows.

In case that BurstLength0 field for burst length information transmission of $15^{th}$ multiplex is not separately configured, TotalBurstLength0 field having a 10-bit length and BurstLength0 field having a (4×(MultiplexesPerInterlace−1))-bit length should be transmitted. Meanwhile, in case that BurstLength0 field is directly configured, a (4×MultiplexesperInterlace)-bit BurstLength0 field is just transmitted without configuring TotalBurstLength0 field.

Hence, an overhead message length in case of configuring BurstLength field separately is smaller than that in case of not configuring BurstLength0 field separately by 6-bits per interlace. Considering four interlaces, the overhead message length is reduced by 24-bits. Namely, in aspect of a transmitting side, an overhead message reduced by 24-bits can be transmitted.

In aspect of a receiving side, in case of not configuring BurstLength0 field separately for $15^{th}$ multiplex, calculation according to Formula 2 is required for obtaining a length of $15^{th}$ multiplex burst. Yet, in case of configuring BurstLength0 field directly, such a calculation process is not necessary.

Table 4 shows an example of a broadcast overhead message.

TABLE 4

| Interlace0Included | 1 |
|---|---|
| SameBurstLengths0 | 0 or 1 |
| TotalBurstLength0 | 0 or 10 |
| UserProposedMethod | 1 |
| Zero or MultiplexesPerInterlace occurrences of the following field: | |
| SameBurstLengthWithMajoirty0 | 1 |
| Zero, one, MultiplexesPerInterlace − 1 or Total Number of SameLengthWithMajority set to '0' occurrence of the following field: | |
| BurstLength0 | 4 |
| Interlace1Included | 1 |
| SameBurstLengths1 | 0 or 1 |
| TotalBurstLength1 | 0 or 10 |
| UserProposedMethod | 1 |
| Zero or MultiplexesPerInterlace occurrences of the following field: | |
| SameBurstLengthWithMajoirty1 | 1 |
| Zero, one, MultiplexesPerInterlace − 1 or Total Number of SameLengthWithMajority set to '0' occurrence of the following field: | |
| BurstLength1 | 4 |
| Interlace2Included | 1 |
| SameBurstLengths2 | 0 or 1 |
| TotalBurstLength2 | 0 or 10 |
| UserProposedMethod | 1 |

TABLE 4-continued

| | |
|---|---|
| Zero or MultiplexesPerInterlace − 1 occurrence of the following field: | |
| SameBurstLengthWithMajoirty2 | 1 |
| Zero, one, MultiplexesPerInterlace − 1 or Total Number of SameLengthWithMajority set to '0' occurrence of the following field: | |
| BurstLength2 | 4 |
| Interlace3Included | 1 |
| SameBurstLengths3 | 0 or 1 |
| TotalBurstLength3 | 0 or 10 |
| UserProposedMethod | 1 |
| Zero or MultiplexesPerInterlace occurrences of the following field: | |
| SameBurstLengthWithMajoirty3 | 1 |
| Zero, one, MultiplexesPerInterlace − 1 or Total Number of SameLengthWithMajority set to '0' occurrence of the following field: | |
| BurstLength3 | 4 |

Each field of the broadcast overhead message is explained in detail as follows.

Similar to the case of Table 1, the Interlace0Included, Interlace1Included, Interlace2Include and Interlace3Included are fields to indicate what kind of interlace is used in transmitting BCMC service flows from a base station. 1-bit length is allocated to each of the fields. If the field is set to '1', it means that a logical channel is transmitted via a corresponding interlace. If the field is set to '0', it means that a logical channel is not transmitted via a corresponding interlace.

The SameBurstLength0 field is an indicator indicating whether burst lengths of all multiplexes configuring interlace #0 are identical to each other. Namely, if the SameBurstLength0 is '1', it means that burst lengths of all multiplexes are identical. If the SameBurstLength0 is '0', it means that burst lengths of all multiplexes are different from each other.

TotalBurstLength0 is not transmitted if SameBurstLength0 is '1'. Yet, if SameBurstLength0 is '0' since lengths of multiplex bursts are different from each other, TotalBurstLength0 plays a role in indicating a total length of all multiplexes. And. 10 bits are allocated to TotalBurstLength0 field.

UseProposedMethod field is a field indicating whether a reference length shall be used or not. Namely, although burst lengths of multiplexes configuring a specific interlace are not equal to each other, if most of the multiplexes are equal to each other in burst length ('reference length') and if the rest of the multiplexes differ from each other in burst length, the UseProposedMethod field has a value of '1'.

In case that the UseProposedMethod field has a value of '1', a base station includes 1-bit SameBurstLengthWithMajority information corresponding to the number of MultiplexesPerInterlace. Namely, if a burst length of a corresponding multiplex coincides with the burst length ('reference length') of each of multiplexes with majority, a value of the SameBurstLengthWithMajority field is '1'. Yet, if a burst length of a corresponding multiplex is different from the reference length, the SameBurstLengthWithMajority field has a value of '0'.

In determining the reference length, multiplexes are classified into several groups with reference to the equality of burst length and a burst length corresponding to the group having the biggest number of multiplex members can be determined as the reference length. Meanwhile, if there exist at least two groups having the biggest number of multiplex members, one of the at least two groups is selected to determine the corresponding burst length as the reference length.

If UseProposedMethod has a value of '1', BurstLength0 field can be included as many as the number of SameBurstLengthWithMajority fields having values of '0' and can have a 4-bit length. A first BurstLength0 field has information about a reference length. Meanwhile, other BurstLength0 field(s) includes burst length information of multiplexes each of which has a burst length different from the reference length.

In this case, even if a multiplex having a burst length different from the reference length, burst length information for a last multiplex can be omitted. This is because a burst length for a last multiplex can be calculated from the TotalBurstLength, MultiplexesPerInterlace and BurstLength.

Table 5 shows an example of a burst length corresponding to each multiplex. In Table 5, (a, b) indicates an interlace(a)-multiplex(b) pair.

TABLE 5

| Interlace-Multiplex Pair | Multiplex Burst Length |
|---|---|
| (0, 0) | 2 |
| (0, 1) | 2 |
| (0, 2) | 64 |
| (0, 3) | 2 |
| (0, 4) | 4 |
| (0, 5) | 2 |
| (0, 6) | 2 |
| (0, 7) | 2 |
| (0, 8) | 2 |
| (0, 9) | 2 |
| (0, 10) | 2 |
| (0, 11) | 2 |
| (0, 12) | 2 |
| (0, 13) | 2 |
| (0, 14) | 2 |
| (0, 15) | 4 |

Table 5 shows an example of a case that Interlace #0 includes sixteen multiplexes. In the example of Table 4, thirteen multiplexes except $2^{nd}$, $4^{th}$ and $15^{th}$ multiplexes has the same burst length. In this case, fifteen BurstLength0 fields are needed using the overhead message shown in Table 1. Namely, the respective BurstLength0 fields should be configured using 60-bits like '0001 0001 1111 0001 0011 0001 0001 0001 0001 0001 0001 0001 0001 0001 0001'.

Yet, in case of using the overhead message shown in Table 4, sixteen SameBurstLengthWithMajority fields are configured to indicate multiplexes differing from the reference length. Namely, by such a setting as '1101011111111110', information about a multiplex having a burst length different from the reference length can be included.

Meanwhile, it is unnecessary to configure sixteen BurstLength0 fields to include entire burst length information about fifteen multiplexes. Namely, $1^{st}$ BurstLength0 field includes information about a reference length, and $2^{nd}$ and $3^{rd}$ BurstLength0 fields include information about burst lengths of $2^{nd}$ and $4^{th}$ multiplexes. Meanwhile, although $15^{th}$ multiplex has a burst length different from the reference length, it is able to calculate the burst length from TotalBurstLength, MultiplexesPerInterlace and another BurstLength fields. So, BurstLength0 field for burst length information transmission of the 15$^{th}$ multiplex can be calculated in a manner of Formula 2 instead of being separately configured.

Burst length of 15th multiplex=TotalBurstLength−
(No. of SameBurstLengthWithMajority having a
value of '1')*1$^{st}$ BurstLength−BurstLength corresponding to 2$^{nd}$−BurstLength corresponding to
4$^{th}$   [Formula 2]

Table 6 shows an example of comparison between overhead message sizes according to Table 1 and Table 4.

TABLE 6

| Field | Case of Table 1 | Case of Table 3 |
|---|---|---|
| Interlace0Included | 1 | 1 |
| SameBurstLength0 | 1 | 1 |
| TotalBurstLength0 | 10 | 10 |
| UserProposedMethod | | 1 |
| SameBurstLengthWithMajority | | 16 |
| BurstLength0 | 15 * 4 = 60 | 3 * 4 = 12 |

Referring to Table 6, it can be seen that total 72-bits are required for the broadcast overhead message according to Table 1. Meanwhile, in the same situation, it can be seen that total 41-bits are required for the broadcast overhead message according to Table 4.

Table 7 shows an example of a broadcast overhead message.

TABLE 7

| | |
|---|---|
| Interlace0Included | 1 |
| SameBurstLengths0 | 0 or 1 |
| UserProposedMethod | 1 |
| Zero or MultiplexesPerInterlace occurrences of the following field: | |
| SameBurstLengthWithMajoirty0 | 1 |
| Zero, one, MultiplexesPerInterlace or (Total Number of SameLengthWithMajority0 set to '0') + 1 occurrence of the following field: | |
| BurstLength0 | 4 |
| Interlace1Included | 1 |
| SameBurstLengths1 | 0 or 1 |
| UserProposedMethod | 1 |
| Zero or MultiplexesPerInterlace occurrences of the following field: | |
| SameBurstLengthWithMajoirty1 | 1 |
| Zero, one, MultiplexesPerInterlace or (Total Number of SameLengthWithMajority1 set to '0') + 1 occurrence of the following field: | |
| BurstLength1 | 4 |
| Interlace2Included | 1 |
| SameBurstLengths2 | 0 or 1 |
| UserProposedMethod | 1 |
| Zero or MultiplexesPerInterlace occurrences of the following field: | |
| SameBurstLengthWithMajoirty2 | 1 |
| Zero, one, MultiplexesPerInterlace or (Total Number of SameLengthWithMajority2 set to '0') + 1 occurrence of the following field: | |
| BurstLength2 | 4 |
| Interlace3Included | 1 |
| SameBurstLengths3 | 0 or 1 |
| UserProposedMethod | 1 |
| Zero or MultiplexesPerInterlace occurrences of the following field: | |
| SameBurstLengthWithMajoirty3 | 1 |
| Zero, one, MultiplexesPerInterlace or (Total Number of SameLengthWithMajority3 set to '0') + 1 occurrence of the following field: | |
| BurstLength3 | 4 |

Referring to Table 7, an overhead message can be transmitted without TotalBurstLength field indicating a total burst length.

In case of Table 4, TotalBurstLength field is transmitted by omitting the field indicating a last burst length. In case of Table 7, a field indicating a last burst length is added to transmit multiplex length information instead of omitting TotalBurstLength field.

For instance, in case that Interlace #0 includes sixteen multiplexes of 0$^{th}$ to 15$^{th}$, 15$^{th}$ BurstLength0 can be transmitted instead of transmitting TotalBurstLength0 for 15$^{th}$ multiplex burst length information transmission.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, the present invention is applicable to a mobile communication field and enables packet transmission to be more efficiently performed.

The invention claimed is:

1. In a packet reception method applied to a mobile communication system, in which data transmission is performed by repeating at least two interlaces by a predetermined cycle, the packet reception method comprising the steps of;
receiving a broadcast/multicast packet from a base station;
receiving a broadcast overhead message including information of a reference multiplex burst length and information about multiplexes, each multiplex having a burst length different from the reference multiplex burst length; and
decoding the received broadcast/multicast packet using the information included in the broadcast overhead message.

2. The packet reception method of claim 1, wherein the reference multiplex burst length corresponds to a burst length of a group having a biggest number of multiplex members in case that the multiplexes are grouped according to burst length equality.

3. The packet reception method of claim 1, wherein the broadcast overhead message further includes information about a value of totaling the burst length of at least one or more multiplexes configuring one interlace.

4. The packet reception method of claim 3, wherein the broadcast overhead message further includes an indicator indicating whether to include the reference multiplex burst length information and the information about the multiplexes, each having the burst length different from the reference multiplex burst length.

5. The packet reception method of claim 4, wherein the broadcast overhead message further includes information indicating whether the burst length of each of the multiplexes is equal to the reference multiplex burst length.

6. The packet reception method of claim 5, wherein the broadcast overhead message includes burst length information corresponding to each of the multiplexes and wherein the burst length information of the multiplex having the burst length equal to the reference multiplex burst length is omitted.

7. In a packet reception method applied to a mobile communication system, in which data transmission is performed by repeating at least two interlaces by a predetermined cycle, the packet reception method comprising the steps of:

receiving a broadcast/multicast packet from a base station;

receiving a broadcast overhead message including information of a reference multiplex burst length and information about multiplexes, each having a burst length different from the reference multiplex burst length wherein information about a total of burst lengths of the multiplexes is omitted in the broadcast overhead message; and decoding the received broadcast/multicast packet using the information included in the broadcast overhead message.

\* \* \* \* \*